United States Patent
Carrington et al.

(10) Patent No.: US 12,524,588 B2
(45) Date of Patent: Jan. 13, 2026

(54) PREDICTING INTERIOR MODELS OF STRUCTURES

(71) Applicant: Unearthed Land Technologies, LLC, Cocoa, FL (US)

(72) Inventors: Charles C. Carrington, Cocoa, FL (US); Aaron Westre, Minneapolis, MN (US)

(73) Assignee: Unearthed Land Technologies, LLC, Cocoa, FL (US)

( * ) Notice: Subject to any disclaimer, the term of this patent is extended or adjusted under 35 U.S.C. 154(b) by 1057 days.

(21) Appl. No.: 17/559,297

(22) Filed: Dec. 22, 2021

(65) Prior Publication Data
US 2023/0195971 A1   Jun. 22, 2023

(51) Int. Cl.
| | |
|---|---|
| *G06F 7/48* | (2006.01) |
| *G06F 30/12* | (2020.01) |
| *G06F 30/13* | (2020.01) |
| *G06F 30/27* | (2020.01) |

(52) U.S. Cl.
CPC .............. *G06F 30/27* (2020.01); *G06F 30/12* (2020.01); *G06F 30/13* (2020.01)

(58) Field of Classification Search
CPC ............ G06F 30/12; G06F 30/13; G06F 30/27
See application file for complete search history.

(56) References Cited

U.S. PATENT DOCUMENTS

| | | | |
|---|---|---|---|
| 10,809,066 B2 * | 10/2020 | Colburn | G06V 20/20 |
| 10,817,626 B2 * | 10/2020 | Wright | G06F 30/18 |
| 2019/0019324 A1 | 1/2019 | Wu et al. | |
| 2020/0057824 A1 * | 2/2020 | Yeh | G06F 30/13 |
| 2021/0117583 A1 | 4/2021 | Strong | |
| 2021/0343073 A1 | 11/2021 | Carrington | |

* cited by examiner

*Primary Examiner* — Nithya J. Moll
(74) *Attorney, Agent, or Firm* — K&L Gates LLP

(57) ABSTRACT

Methods and systems for improved prediction and generation of structure interiors are provided. In one embodiment a method is provided that includes receiving exterior imagery of the structure and determining an exterior surface of the structure with a machine learning model. The exterior surface may enclose exterior portions of the structure. The machine learning model may further determine exterior features of the structure and may determine, based on the exterior surface of the exterior features, an interior model of the structure. A three-dimensional representation of interior and exterior portions of structure may be generated based on the exterior surface and the interior model.

18 Claims, 8 Drawing Sheets

PREDICTING INTERIOR MODELS OF STRUCTURES

BACKGROUND

In various situations and applications, it may be advantageous to know the interior layout of a structure prior to entering the structure. For example, interior layouts may be useful, e.g., in emergency response scenarios, demolitions analysis, military scenarios, and the like.

SUMMARY

The present disclosure presents new and innovative systems and methods for improved prediction and generation of structure interiors. In a first aspect, a method is provided that includes receiving exterior imagery of a structure and determining, with a machine learning model, an exterior surface of the structure. The exterior surface may enclose exterior portions of the structure depicted within the exterior imagery. The machine learning model may also determine exterior features of the structure based on the exterior imagery and/or the exterior surface. The machine learning model may also determine an interior model of the structure based on the exterior surface and the exterior features. The method may also include generating a three-dimensional representation of interior portions of the structure and exterior portions of the structure based on the exterior surface and the interior model.

In a second aspect according to the first aspect, the exterior features include at least one of doors, windows, structural support elements, corners, roofs, and/or utility systems of the structure.

In a third aspect according to any of the first and second aspects, the structure has multiple floors and determining the interior model comprises determining multiple interior models for the multiple floors.

In a fourth aspect according to the third aspect, the multiple floors of the structure are identified based on exterior features of the structure.

In a fifth aspect according to the fourth aspect, the multiple floors are identified based on multiple levels of windows at multiple heights within the structure.

In a sixth aspect according to any of the first through fifth aspects, the method further includes, prior to receiving the exterior imagery, receiving training data for a plurality of structures. The training data may include exterior imagery of the plurality of structures, expected exterior surfaces for the plurality of structures, expected exterior features for the plurality of structures, and expected interior models for the plurality of structures. A first machine learning model may be trained to generate predicted exterior surfaces and predicted exterior features of at least a subset of the plurality of structures based at least on (i) exterior imagery of the subset of the plurality of structures and (ii) expected exterior surfaces of the subset of the plurality of structures. The first machine learning model may also be trained to predict interior models for at least the subset of the plurality of structures based at least on the predicted exterior surfaces and the predicted exterior features.

In a seventh aspect according to the sixth aspect, the method further includes, prior to receiving the training data, receiving a plurality of architectural plans for the plurality of structures and generating, with a second machine learning model, the expected interior models for the plurality of structures based on the plurality of architectural plans.

In an eighth aspect according to the sixth and seventh aspects, training the first machine learning model to predict exterior contours and exterior features includes receiving first exterior imagery of a first structure from the plurality of structures and predicting, with the first machine learning model, a first exterior surface of the first structure and first exterior features based on the first exterior imagery. One or more differences may be detected between (i) between the first exterior surface of the first structure and an expected exterior surface of the first structure and/or (ii) between the first exterior features and expected exterior features of the first structure. One or more parameters of the first machine learning model may be adjusted based on the one or more differences.

In a ninth aspect according to any of the sixth through eighth aspects, training the first machine learning model to predict the interior models includes receiving an exterior surface and exterior features of a first structure from the plurality of structures and predicting, with the first machine learning model, a first interior model of the first structure based on the exterior contour of the first structure. One or more differences may be detected between the first interior model of the first structure and an expected interior model of the first structure. One or more parameters of the first machine learning model may be adjusted based on the one or more differences.

In a tenth aspect according to any of the first through ninth aspect, the structure includes at least one of: a building, a vehicle, an infrastructure component, a ship, a spacecraft, an aircraft, a tank, and/or an appliance.

In an eleventh aspect, a method is provided that includes receiving training data for a plurality of structures. The training data may include exterior imagery of the plurality of structures, expected exterior surfaces for the plurality of structures, expected exterior features for the plurality of structures, and expected interior models for the plurality of structures. A first machine learning model may be trained to generate predicted exterior surfaces and predicted exterior features for at least a subset of the plurality of structures based at least on (i) exterior imagery of the subset of the plurality of structures and (ii) expected exterior surfaces of the subset of the plurality of structures. The first machine learning model may also be trained to predict interior models for at least the subset of the plurality of structures based at least on the predicted exterior surfaces and the predicted exterior features. The first machine learning model may be deployed to predict exterior contours and interior models for additional structures separate from the plurality of structures.

In a twelfth aspect according to the eleventh aspect, the method further includes, prior to receiving the training data, receiving a plurality of architectural plans for the plurality of structures and generating, with a second machine learning model, the expected interior models for the plurality of structures based on the plurality of architectural plans.

In a thirteenth aspect according to any of the eleventh and twelfth aspects, training the first machine learning model to predict exterior contours and exterior features includes receiving first exterior imagery of a first structure from the plurality of structures and predicting, with the first machine learning model, a first exterior surface of the first structure and first exterior features based on the first exterior imagery. One or more differences may be determined (i) between the first exterior surface of the first structure and an expected exterior surface of the first structure and/or (ii) between the first exterior features and expected exterior features of the first structure. One or more parameters of the first machine learning model may be adjusted based on the one or more differences.

In a fourteenth aspect according to any of the eleventh through thirteenth aspects, training the first machine learning model to predict the interior models includes receiving an exterior surface and exterior features of a first structure from the plurality of structures and predicting, with the first machine learning model, a first interior model of the first structure based on the exterior surface of the first structure. One or more differences may be determined between the first interior model of the first structure and an expected interior model of the first structure. One or more parameters of the first machine learning model may be adjusted based on the one or more differences.

In a fifteenth aspect according to the fourteenth aspect, the exterior surface of the first structure is one of an expected exterior surface of the first structure included within the training data and/or a predicted exterior surface of the first structure generated by the first machine learning model. The exterior features of the first structure may be one of expected exterior features of the first structure included within the training data and/or predicted exterior features of the first structure generated by the first machine learning model.

In a sixteenth aspect according to any of the eleventh through fifteenth aspects, training the first machine learning model to predict the interior models includes training the first machine learning model to generate interior models that comply with at least one of (i) spatial constraints of the exterior surfaces and/or (ii) common construction methods and structural design requirements.

In a seventeenth aspect according to the sixteenth aspect, the at least one of (i) the spatial constraints of the exterior surfaces and/or (ii) the common construction methods and structural design requirements are represented within an objective function for the first machine learning model.

In an eighteenth aspect according to any of the eleventh through seventeenth aspects, deploying the first machine learning model further includes receiving exterior imagery of a structure and determining, with a machine learning model, an exterior surface, exterior features, and an interior model of the structure. A three-dimensional representation of interior portions of the structure and exterior portions of the structure may be generated based on the exterior surface and the interior model.

In a nineteenth aspect according to the eighteenth aspect, determining the exterior contours, exterior features, and an interior model of the structure further includes determining, with a machine learning model, an exterior surface of the structure that encloses exterior portions of the structure depicted within the exterior imagery and determining, with the machine learning model, exterior features of the structure based on the exterior imaging and/or the exterior surface. An interior model of the structure may also be determined based on the exterior contours and the exterior features using the machine learning model.

In a twentieth aspect according to any of the thirteenth through nineteenth aspects, the exterior features include at least one of doors, windows, structural support elements, corners, and/or utility systems of the structure.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Figure 1:
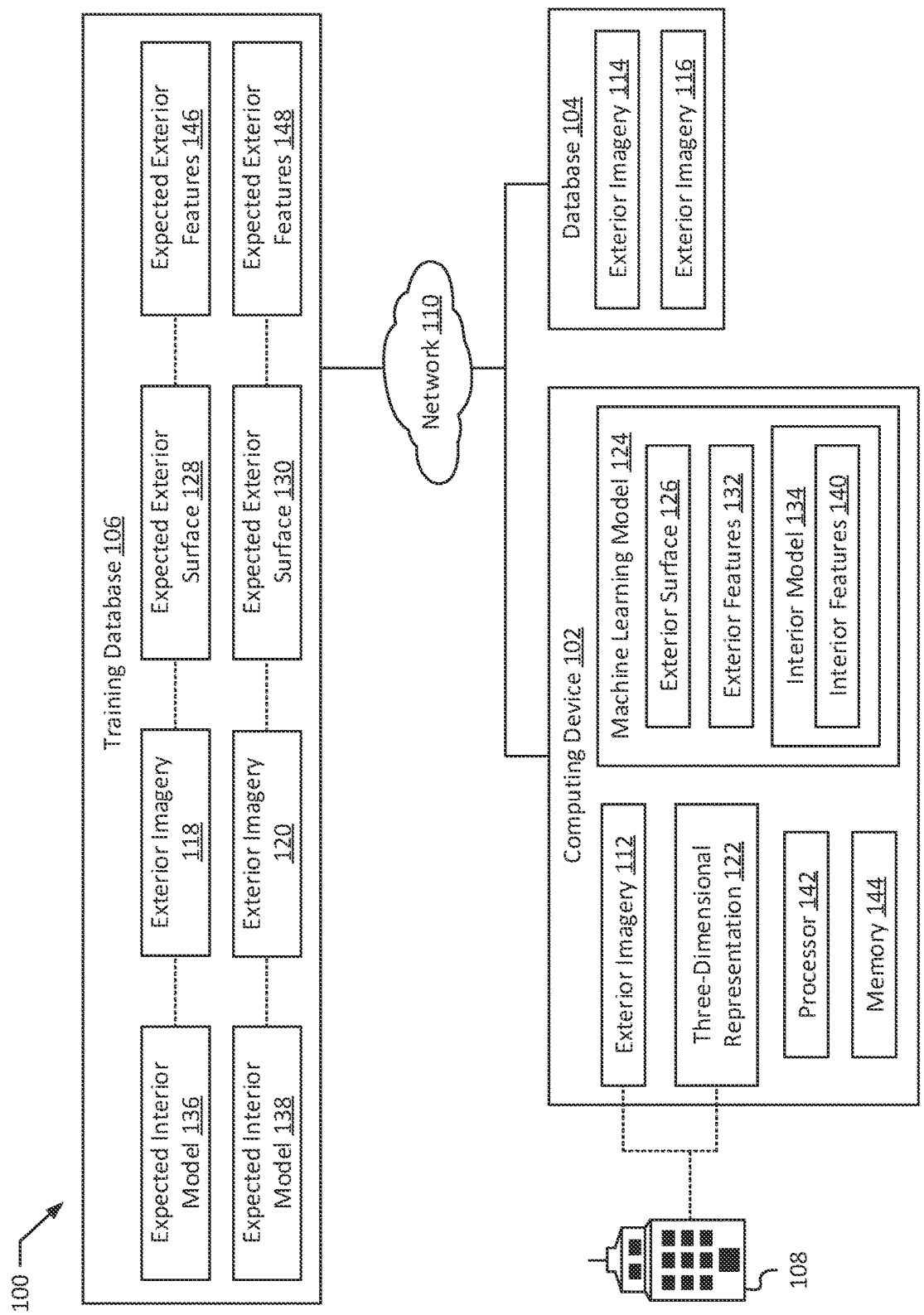
FIG. 1 illustrates a system for predicting interior models of structures according to an exemplary embodiment of the present disclosure.

For certain buildings, it may be possible to look up access architectural plans (e.g., blueprints, floor plans) that depict or otherwise represent interior layouts for the building. In such scenarios, it may be possible to reconstruct an interior layout of the building based on these plans. For example, U.S. patent application Ser. No. 17/487,838 describes various techniques for extracting and constructing an interior layout of a building based on architectural plans for the building.

However, in certain scenarios, it may not be feasible to locate copies of architectural plans for certain structures. For example, in combat scenarios, individuals may not have access to architectural plans for buildings prior to entry. In emergency response scenarios, there may not be time to locate copies of the architectural plans for a building. It may further be appreciated that architectural plans for various structures may not be readily accessible for various other reasons (e.g., plans that have not been digitized, plans that are stored in private or siloed databases, plans that have been lost). Accordingly, it may be necessary to rapidly reconstruct a structure's interior layout using other means.

In many situations, exterior imagery of a structure may be more readily available. For example, overhead imagery (e.g., captured by a satellite or UAV) and/or other imagery (e.g., captured by individuals located in view of the building) may be used to assist in determining a plausible interior layout for the structure. Architectural technicians may then analyze the exterior image using specialized software to make representative models of structures based on standard construction templates and common practices. These representative models (interior and exterior models) may then be used for various types of structural analysis. However, these techniques are slow and cumbersome and often cannot be done quickly enough for use in emergency scenarios. Therefore, there exists a need to expedite and automate this process such that exterior imagery can be used to predict interior layouts in emergency scenarios.

One solution to this problem is to analyze the exterior imagery using one or more machine learning models. In one implementation, the machine learning model may analyze the exterior imagery to determine an exterior surface of a structure depicted in the exterior imagery. The exterior imagery and/or the exterior surface may then be used by the model to identify one or more exterior features of the structure. In certain instances, these exterior features may be common to both the interior and exterior of the structure. The exterior surface and the exterior features may then be used to predict an interior model of the structure that contains one or more interior features. These interior features may include structural features (e.g., support beams, wall assemblies) and/or functional features for occupants of the structure (e.g., doors, windows, plumbing, HVAC components). The machine learning model may be configured to arrange the interior features for the structure such that the interior features align with any associated exterior features and fit within the exterior surface of the structure. In certain scenarios, the machine learning model may be trained based on the outputs of other machine learning models. For example, a second machine learning model may be used to generate a training dataset of expected interior layouts for structures based on architectural plans for the structures. In such instances, exterior imagery of a plurality of structures may be combined with known interior layouts for those structures to form a unique training dataset for the machine learning model.

FIG. 1 illustrates a system 100 for predicting interior models of structures according to an exemplary embodiment of the present disclosure. The system 100 may be configured to predict interior models for interior portions of one or more structures 108. In particular, the system 100 may be configured to receive exterior imagery 112 of a structure 108 and generate a three-dimensional representation 122 of the structure 108. The three-dimensional representation 122 may include a three-dimensional model (e.g., computer model, CAD model, a three-dimensional GIS model) of the exterior and interior of the structure 108.

Although depicted as a building in FIG. 1, in practice, the structure 108 may include any type of structure (e.g., man-made structure). For example, the structure 108 may include any structure with an interior space that is at least partially enclosed. As a specific example, the structure may include single-story buildings, multi-story building, warehouse structures, infrastructure facilities, outdoor structures (e.g., pavilions, gazebos, decks, bridges, dams), or combinations thereof. As a further example, infrastructure facilities may include interior and exterior structures of dams, storm water pipes, sewer pipes, tunnels (e.g., access tunnels, tunnels for automobiles), channels, utility stations (e.g., pump stations), conduits (e.g., electrical conduits), and the like. In still further implementations, the structures may include part or other components (e.g., mechanical components, chemical components, electrical components) of other products or devices (e.g., vehicle components, aircraft components, artillery components, weapon components). Accordingly, any reference to buildings herein should be understood to apply similarly to any type of structure. Similarly, the present disclosure uses the terms "blueprint" "architectural plan" and "plan" (and similar terms) to refer to plans for buildings and other structures. One skilled in the art will understand that, in practice, these documents may be referred to using different terminology in other instances. For example, such documents may be referred to as "site plans," "facility plans," or other analogous terminology. As a further example, the plans discussed herein may include one or more floor plans, elevation plans, circuit board layout diagrams, product design plans, and the like. As one specific example, the structure may include an engine of an aircraft, and the plan may include a product design plan for the engine. As another specific example, the structure may include an artillery weapon, and the plan may include a multi-view structural plan or product design plan for the artillery weapon.

The exterior of the structure 108 may include any portion of the structure 108 that is visible from outside of the structure 108 (e.g., visible in exterior imagery of the structure 108). Additionally or alternatively, the exterior of the structure 108 may include the surface of the building that faces an exterior environment of the structure 108 (e.g., an outdoor environment surrounding the structure 108). The interior of the structure 108 may include any portion of the structure 108 that is not visible from outside of the structure 108 (e.g., visible in exterior imagery of the structure 108). In certain instances, portions of the interior of the structure 108 may be visible in exterior imagery (e.g., through windows of the structure 108). Additionally or alternatively, the interior of the structure 108 may include any portion of the structure 108 that is contained within the exterior of the structure 108. In certain instances, the interior of the structure may include portions of outer walls or support systems of the structure 108. For example, the exterior of the structure 108 may include an exterior surface of an outer concrete wall, and the interior of the structure 108 may include interior portions of the concrete wall (e.g., not in direct contact with an outdoor area surrounding the structure 108) and other materials in the outer brick wall (e.g., support beams, internal supporting materials for the concrete wall). In various implementations, the interior of the structure 208 may include one or more of structural components (a frame of the structure 108, load-bearing walls/beams/other system of the structure 108), interior/exterior construction materials of the structure, material properties (e.g., strength under tension/compression, impact resistance, dimensions), structural detailing for the structure 108, and any other elements that contribute to the overall structural strength of the structure 108. In certain implementations, the interior of the structure 108 may include elements that do not contribute to the structural strength of the structure 108, such as non-load-bearing walls, doors, windows, plumbing system, HVAC systems, fire suppression systems, and the like.

In particular, the system 100 may include a computing device 102 configured to receive the exterior imagery 112 and generate the three-dimensional representation 122. For example, computing device 102 may receive the exterior imagery 112 from a database 104 storing exterior imagery 114, 116 for a plurality of different structures. The exterior imagery 112, 114, 116 may represent one or more two- or three-dimensional images depicting an exterior of the structure 108 and, in certain instances an outdoor area surrounding the structure 108. The exterior imagery 112 may include any images of the exterior of the structure 108. For example, the exterior imagery 112 may include overhead imagery (e.g., captured by satellite/UAV). As another example, the exterior imagery 112 may be captured from ground level (e.g., by an individual within view of the structure 108). In certain instances, the exterior imagery 112 may be orthorectified such that the images can be used (e.g., by a user or computing process) as a basis for accurate spatial measurements of the structure. In further instances, the exterior imagery 112 may include three-dimensional imagery of the exterior of the structure 108.

The computing device 102 may contain a machine learning model 124 configured to determine an exterior surface 126 and/or an interior model 134 for the structure 108. For example, the machine learning model 124 may determine, based on the exterior imagery, an exterior surface 126 of the structure 108. The exterior surface 126 may include a three-dimensional representation of the exterior of the structure 108. For example, the exterior surface 126 may include a three-dimensional envelope or contour approximating the shape of the exterior of the structure 108. The machine learning model 124 may additionally identify one or more exterior features 132 depicted within the exterior imagery 112 and/or based on the exterior surface 126. In certain implementations, the exterior features 132 may include one or more functional or aesthetic features of the structure 108 that are exteriorly visible on the structure 108. In certain implementations, at least a subset of the exterior features 132 may be common to an exterior of the structure and interior of the structure. For example, the exterior features 132 may include windows, doors, exterior vents, outer wall materials, visible/exposed support elements, and the like.

Based on the exterior surface 126 and the exterior models 132, the machine learning model 124 may determine an interior model 134. The interior model 134 may represent a predicted layout or structural plan of an interior portion of the structure 108. For example, the interior model 134 may represent a two-dimensional and/or a three-dimensional representation of an interior portion of the structure 108. In particular, the interior model 134 may be generated to comply with one or more spatial constraints of the exterior surface 126 and common construction methods and structural design requirements (e.g., constraints representative of well established, common construction methods, and standard construction templates and structural design rules of thumb). For example, the interior model 134 may be generated by combining a plurality of interior features that are common to structures (e.g., structures of the same type as the structure 108). For example, where the exterior features 132 indicate that the structure 108 has a concrete exterior wall, the interior features 140 may include a common concrete wall assembly, selected based on a size (e.g., length and height) of the wall. As another example, where the exterior features 132 indicate that the structure 108 has glass exterior walls, the interior features 140 may include support structures (e.g., support frames) common to buildings with glass exterior walls. The interior layout features may then be combined and arranged to comply with one or more restrictions indicated by the exterior surface 126 and/or the exterior features 132. In particular, the interior features 140 may be generated to align with one or more exterior features 132. As a particular example, the interior model 134 may be generated to contain rooms that align with certain exterior features 132, such as windows and exterior air conditioning units. Additionally or alternatively, the interior features 140 may be generated to fit within the exterior surface 126. For example, the exterior surface 126 may define boundaries for exterior walls of the interior model 134. Accordingly, rooms within the interior model 134 (and the interior features 140 contained within) may be generated to fit within the boundaries indicated by the exterior surface 126. In certain implementations, to comply with the exterior surface 126 and the exterior features 132, the machine learning model 124 may generate a plurality of interior features 140 based on common construction practices. The machine learning model 124 may then combine and arrange these interior features 140 to fit within the exterior surface 126 and to align with one or more exterior features 132 that are common to both an exterior and an interior of the structure 108.

Figure 2:
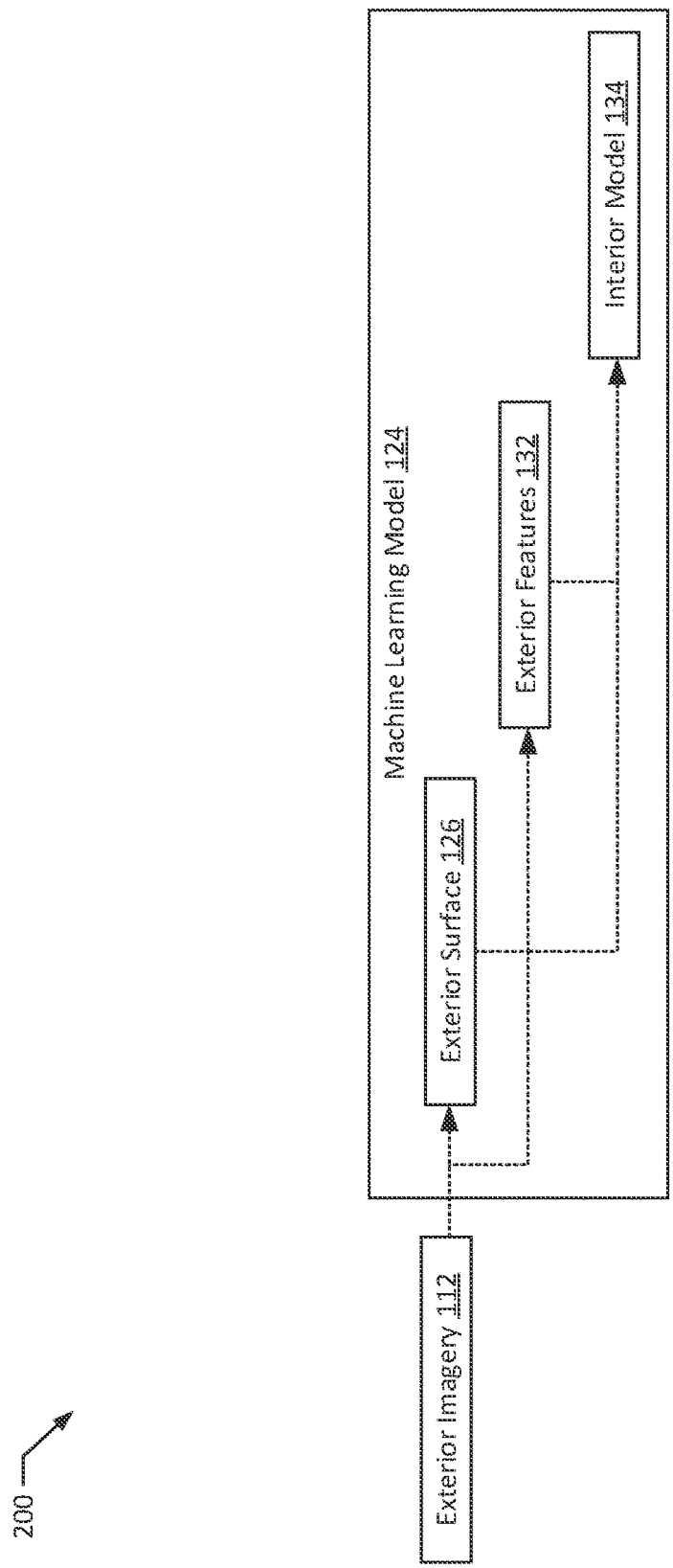
FIG. 2 illustrates a machine learning model processing flow according to an exemplary embodiment of the present disclosure.

In certain implementations, the machine learning model 124 may determine the exterior surface 126, exterior features 132, and interior model 134 in a particular order based on the received exterior imagery 112. For example, FIG. 2 illustrates a machine learning model processing flow 200 according to an exemplary embodiment of the present disclosure. In the machine learning model processing flow 200, the machine learning model 124 receives the exterior imagery 112. Based on the exterior imagery 112, the machine learning model 124 may identify an exterior surface 126 for the structure 108. In particular, the machine learning model 124 may construct a three-dimensional bounding surface for the structure 108 depicted within the exterior imagery 112. For example, the machine learning model 124 may align multiple images of the structure 108 based on various visual/spatial features and extract, based on the aligned images, an approximate exterior surface that encompasses the depicted portions of the structure 108. The machine learning model 124 may then identify exterior features 132 based on the exterior imagery 112 and/or the exterior surface 126. For example, the machine learning model 124 may include a neural network (e.g., convolutional neural network, recurrent neural network) configured to identify certain types of predetermined features depicted within the exterior imagery 112, informed by the associated contours of the features in the exterior surface 126. Then, based on the exterior surface 126 and the exterior features 132, the machine learning model 124 may determine the interior model 134 for the structure 108, using techniques discussed above.

Figure 3:
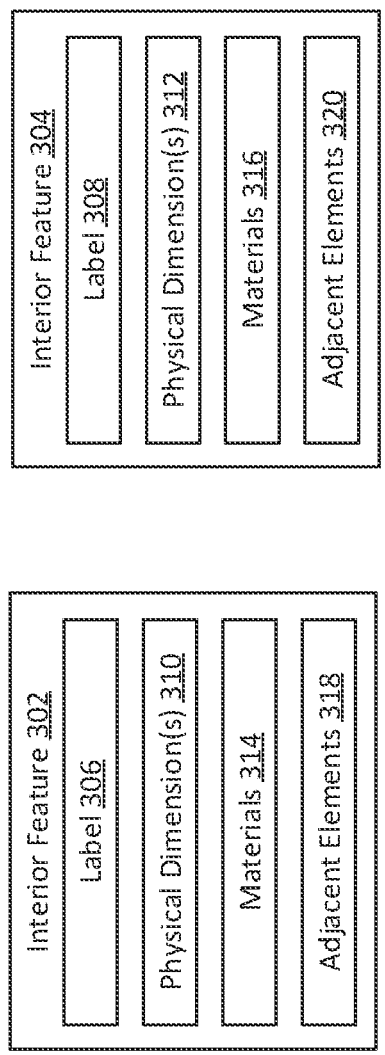
FIG. 3 illustrates features according to an exemplary embodiment of the present disclosure.

The actual exterior features 132 and interior features 140 generated by the machine and model 124 may contain one or more different types of information. For example, FIG. 3 illustrates features 302, 304 according to an exemplary embodiment of the present disclosure. In particular, FIG. 3 depicts an interior feature 302, which may be an exemplary implementation of one of the interior features 140, and an exterior feature 304, which may be an exemplary implementation of one of the exterior features 132. Each of the features 302, 304 includes a label 306, 308, physical dimensions 310, 312, materials 314, 316, and one or more adjacent elements 318, 320. The label 306, 308 may indicate a title or type of feature for the features 302, 304. For example, the label 306 for the interior feature 302 may identify the feature 302 as an "interior door." As another example, the label 308 for the exterior feature 304 may identify the feature 304 as a "window." In additional or alternative implementations, the labels 306, 308 may provide further information regarding the features 302, 304. For example, the features 302, 304 may include information regarding the material properties of the materials used to construct the features (e.g., strength under tension/compression, impact resistance, assembly techniques). In certain implementations, the labels 306, 308 may include a unique identifier (e.g., unique alphanumeric identifier) of the features 302, 304, which may be used to uniquely refer to the specific feature 302, 304 elsewhere within the interior model 134.

The physical dimensions 310, 312 may indicate one or more physical dimensions (e.g., length, width, height, thickness) for the features 302, 304. For example, the physical dimensions 312 may include a height and width for a window (e.g., the exterior feature 304). As another example, the physical dimensions 310 may include the height and width of an interior door (e.g., the interior feature 302). In additional or alternative implementations, physical dimensions 310, 312 may include one or more of a length and thickness of a support beam and/or a length and thickness of an interior wall assembly.

The materials 314, 316 may indicate one or more construction materials used to form the features 302, 304. For example, where the features 302, 304 correspond to individual structural elements (e.g., support beams, windows, doors, drywall, ducts), the materials 314, 316 may indicate the materials from which the individual elements are made. Additionally or alternatively, the features 302, 304 may correspond to certain assemblies (e.g., wall assemblies). In such instances, the materials 314, 316 indicate a type of assembly, which may specify one or more materials used to construct the assembly (e.g., size and spacing of support beams, use of brick, concrete, drywall, thickness of any cladding material used).

Additionally or alternatively, the features 302, 304 may specify one or more adjacent elements 318, 320. For example, the adjacent elements 318, 320 may identify interior features and/or exterior features that are immediately adjacent to the features 302, 304. For example, where the interior feature 302 is a door, the adjacent elements 318 may include unique identifiers (e.g., labels 306) for walls that are adjacent to the door. As another example, where the exterior feature 304 is an exterior HVAC unit, the adjacent elements 320 may identify adjacent structural elements (e.g., adjacent walls and/or roofs) and/or adjacent HVAC elements (e.g., ducts connected to the exterior HVAC unit).

It should be understood that the above examples of labels 306, 308, physical dimensions 310, 312, materials 314, 316, and adjacent elements 318, 320 are merely illustrative. Accordingly, based on the present disclosure, one skilled in the art may recognize additional or alternative labels, physical dimensions, materials, and/or adjacent elements that may be used to describe interior features and/or exterior features. Furthermore, one skilled in the art may understand that the features 302, 304 may contain additional or alternative information, including omitting one or more of the labels, physical dimensions, materials, and/or adjacent elements and including adding one or more additional fields to the features 302, 304. All such implementations are hereby considered within the scope of the present disclosure.

Returning to FIG. 1, the machine learning model 124 may generate the interior model 134 to contain interior features and/or exterior features 132 as discussed above in connection with FIG. 3. Furthermore, however, the machine learning model 124 may generate the interior model 134 to include a visual or structural depiction of the structure 108. In particular, the interior model 134 may contain a visual depiction of the interior features 140 arranged to comply with the exterior surface 126 and exterior features 132, as described above. In certain implementations, the interior model 134 may be generated as a two-dimensional representation of the structure 108.

Figure 4:
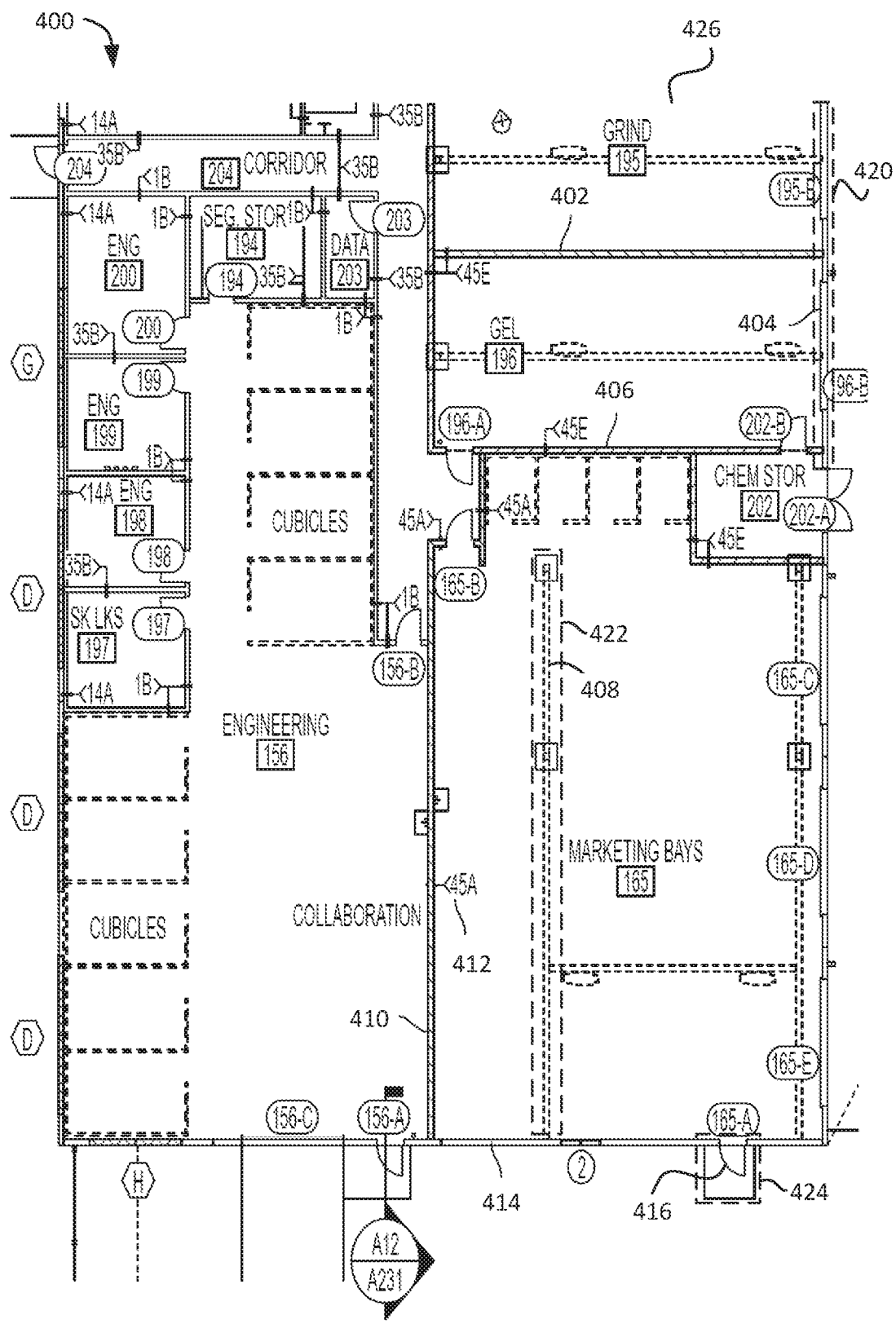
FIG. 4 illustrates an architectural plan according to an exemplary embodiment of the present disclosure.

For example, FIG. 4 illustrates portion of an architectural plan 400 according to an exemplary embodiment of the present disclosure. The plan 400 may be an exemplary implementation of all or part of a two-dimensional interior model 134 that may be generated by a machine learning model 124. The plan 400 includes various elements of a building structure, a portion of which are identified using reference numerals for discussion below. The plan 400 as depicted may be a part of a floor of a building. The plan 400 includes depictions of exterior walls 404, 414 and interior walls 402, 406, 410 (only a subset of which are numbered for clarity). The interior walls 402, 406, 410 include two different types of walls: interior partition walls 402, 406 and interior load-bearing walls 410. The plan 400 also includes a depiction of a foundation structure 408, along with structural ties 412 connecting other parts of the building (e.g., the interior load-bearing wall 410) to the foundation structure 408. The exterior walls 404, 414, load-bearing walls 410, foundation structure 408, and structural ties 412 may all be interior features 140 of a structure.

In certain implementations, not all of the depicted features may be necessary to properly determine an interior layout of the building. For example, the foundation structure 408 and the structural ties 412 may not be necessary to accurately determine the interior layout of the floor. Accordingly, in certain implementations, the machine learning model 134 may not be trained to include foundation structures 408 and/or structural ties 412 as interior features 140 in an interior model 134. For clarity, the plan 400 includes bounding boxes 418, 420, 422, 424 around corresponding elements 202, 204, 208, 216, but such bounding boxes may not be included within the interior model 134 of a corresponding structure 108.

Returning to FIG. 1, the computing device 102 may then generate a three-dimensional representation 122 of the structure 108 based on the interior model 134. For example, where the interior model 134 is a two-dimensional representation of an interior of the structure 108, the computing device 102 may extrude individual interior features 140 within the interior model 134 to generate the three-dimensional representation 122. In particular, the interior features 140 may be extruded according to physical dimensions 310 stored in association with the interior features 140. For example, the physical dimensions 310 may specify a height for one or more individual interior features 140. In such instances, the computing device 102 may extrude individual interior features 140 according to the specified heights while generating the three-dimensional representation 122. Furthermore, the computing device 102 may join the adjacent interior features 140 within the three-dimensional representation 122 (e.g., by extruding between adjacent elements). In particular, adjacent elements may be identified based on corresponding information stored within the interior features 140 (e.g., adjacent elements 318, 320).

In certain instances, the structure 108 may have more than one floor or level. For example, the computing device 102 may determine that the structure 108 includes multiple levels based on exterior dimensions of the structure 108 determined based on the exterior imagery 112 (e.g., a height greater than a certain predetermined threshold, such as 15 feet, 30 feet, 45 feet). Additionally or alternatively, the computing device 102 may determine that the structure 108 includes multiple levels based on exterior features 132 identified within the exterior imagery 112. For example, the computing device 102 may detect horizontal arrangements of windows at a plurality of heights (e.g., three different heights). In such instances, the computing device 102 may determine that the structure 108 has multiple levels (e.g., three different levels).

For a structure 108 that has multiple levels, the machine learning model 124 may be configured to generate a plurality of interior models 134. For example, the machine learning model 124 may generate separate interior models 134 for each of the separate levels detected within the structure 108. In such instances, when generating the three-dimensional representation 122 of the structure 108, the computing device 102 may combine a plurality of three-dimensional representations of individual floors or levels of the structure 108. For example, the three-dimensional representation 122 may be formed by combining three separate three-dimensional representations of each of the three floors, according to the order of the floors within the structure (e.g., from lowest to highest).

In certain implementations, the three-dimensional representation may contain structural information regarding the structure 108. For example, the three-dimensional representation 122 may store materials 314, 316 for individual elements (e.g., individual interior features, individual exterior features) within the three-dimensional representation 122. In particular, each individual element or feature within the three-dimensional representation 122 may contain the corresponding information (e.g., labels, physical dimensions, materials, adjacent elements) stored in association with the corresponding interior feature 140 that was extruded.

Returning to the machine learning model 124, FIG. 1 depicts the machine learning model 124 as a single machine learning model. However, in certain implementations, the machine learning model 124 may be depicted as more than one model. For example, in certain implementations, the machine learning model 124 may be implemented as three separate machine learning models: a first model to generate the exterior surface 126, a second model to identify the exterior features 132, and a third model to generate the interior model 134. Furthermore, it should be understood that, although the terms "machine learning model" and "interior model" both contain the word "model," the interior model 134 should not be understood to include machine learning or other predictive models. In particular, as explained above, the interior model 134 should be understood to contain a representation (e.g., a two-dimensional and/or a three-dimensional representation) of the interior of the structure 108.

Furthermore, the machine learning model 124 may be trained in order to accurately generate an exterior surface 126, exterior features 132, and an interior model 134. In particular, the machine learning model 124 may be trained by the computing device 102 and/or another computing device based on data contained within a training database 106. In particular, the training database 106 may contain exterior imagery 118, 120 stored in association with expected exterior surfaces 128, 130, expected exterior features 146, 148, an expected interior models 136, 138. Techniques for training the machine learning model 124 using data from a training database 106 are discussed in greater detail below in connection with the method 700 and FIG. 7.

In certain implementations, multiple structures may be depicted within the exterior imagery 112. In such instances, the computing device 102 may detect each of the multiple structures 108 and may repeat the processing for each of the structures 108 identified within the imagery. For example, the machine learning model 124 may detect multiple exterior surfaces 126 for multiple structures 108 within the exterior imagery 112. Upon detecting the multiple structures, the machine learning model 124 may then proceed with identifying exterior surfaces 126 and exterior features 132 for each of the multiple structures. The machine learning model 124 may also proceed with generating interior model 134 for each of the individual structures. This processing may be similar to the techniques discussed above in connection with the structure 108. In certain instances, the multiple structures may be processed one at a time (e.g., in an order in which they are detected within the exterior imagery 112). Additionally or alternatively, the structures may be processed at least partially in parallel. For example, the computing device 102 may execute multiple instances of the machine learning model 124, where each instance is responsible for processing a single structure detected within the exterior imagery 112. As another example, the machine learning model 124 may identify exterior surfaces 126 for each of the identified structures before identifying exterior features 132 for each of the multiple structures, and then may finally generate interior models 134 for each of the multiple structures.

The computing device 102 also includes a processor 142 and a memory 144. The processor 142 and the memory 144 may implement one or more aspects of the computing device 102. For example, the memory 144 may store one or more instructions which, when executed by the processor 142, may cause the processor 142 to perform one or more operational features of the computing device 102 (e.g., implement the machine learning model 518). The processor 142 may be implemented as one or more central processing units (CPUs), field programmable gate arrays (FPGAs), and/or graphics processing units (GPUs) configured to execute instructions stored on the memory 144. Additionally, the computing device 102 may be configured to communicate (e.g., with the database 104 and/or the training database 106) using a network 508. For example, the computing device 102 may communicate with the network 508 using one or more wired network interfaces (e.g., Ethernet interfaces) and/or wireless network interfaces (e.g., Wi-Fi®, Bluetooth®, and/or cellular data interfaces). In certain instances, the network may be implemented as a local network (e.g., a local area network), a virtual private network, L1, and/or a global network (e.g., the Internet).

Figure 5:
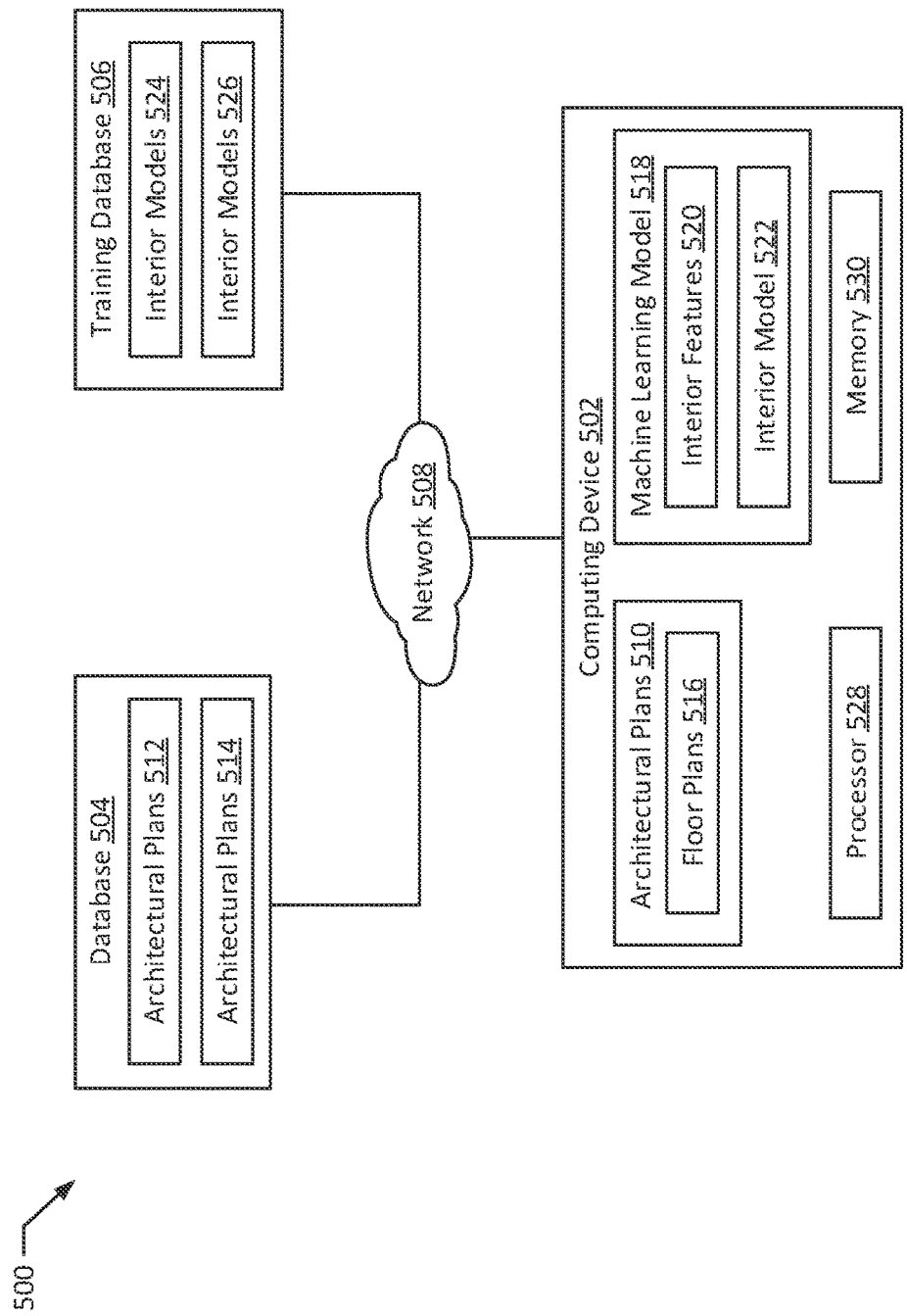
FIG. 5 illustrates a system for generating interior model training data according to an exemplary embodiment of the present disclosure.

FIG. 5 illustrates a system 500 for generating interior model training data according to an exemplary embodiment of the present disclosure. For example, the system 500 may be configured to generate at least a portion of the training data stored within a training database 106 of the system 100. In particular, the system 500 may be configured to generate the expected interior models 136, 138 discussed above. The system 500 includes a computing device 502, a database 504, and a training database 506. The training database 506 may be an exemplary implementation of the training database 106. The training database 506 stories interior models 524, 526, which may be exemplary implementations of the expected interior models 136, 138.

The computing device 502 may receive architectural plans 510 and may generate one or more interior models 522 based on the architectural plans 510. In particular, the architectural plans 510 may include one or more floor plans 516 for a structure, and the computing device 502 may generate interior models 522 for the structure based on the floor plans 516. The computing device 502 may receive the architectural plans 510 from a database 504 configured to store architectural plans 512, 514. For example, the database 504 may be stored blueprints, construction plans, and/or any other architectural plans concerning the multiple structures. In particular, in certain instances, the database 504 may be a governmental or commercial database of architectural plans 512, 514.

The computing device 502 may use a machine learning model 518 to generate the interior model 522. In preferred embodiments, the machine learning model 518 is separate from the machine learning model 124. The machine learning model 518 may detect one or more interior features within the floor plans 516 and may generate interior models 522 based on the interior features and the relative positions within the floor plans 516. In particular, the machine learning model 518 may be configured to identify which sheets within the architectural plans 510 contain or depict floor plans 516 and associated structure. The machine learning model 518 may then use one or more image processing techniques to detect and extract the individual features within the floor plans 516. Detecting and extracting the interior features 520 may include identifying various types of information regarding the interior features, including labels, physical dimensions, materials, adjacent elements, similar to the interior features 140, 302, 304 discussed above. The machine learning model 518 may then construct an interior model 522 that contains the interior features 520 based on the relative positions of the interior features 520 within the floor plans 516. Additional details regarding the techniques used to detect and generate the interior features 520 and interior model 522 are further described in U.S. patent application Ser. No. 17/487,838, filed on Sep. 28, 2021, and entitled "Generating Vector Versions of Structural Plans," the entirety of which is incorporated by reference herein for all purposes.

Once the interior model 522 is generated, the interior model 522 may then be used to train other machine learning models. For example, the interior model 522 may be stored in a training database 506 that contains a plurality of interior models 524, 526. These interior models 522, 524, 526 may be used to train machine learning models for various purposes. In one particular instance, the interior models 522, 524, 526 may be stored within the training database 506 in association with exterior imagery of the corresponding structures. In such instances, the interior models 522, 524, 526 may be used to train the machine learning model 124. In particular, the interior models 522, 524, 526 may be exemplary implementations of the expected interior models 136, 138 in the training database 106.

The computing device 502 also includes a processor 528 and a memory 530. The processor 528 and the memory 530 may implement one or more aspects of the computing device 502. For example, the memory 530 may store one or more instructions which, when executed by the processor 528, may cause the processor 528 to perform one or more operational features of the computing device 502 (e.g., implement the machine learning model 518). The processor 528 may be implemented as one or more central processing units (CPUs), field programmable gate arrays (FPGAs), and/or graphics processing units (GPUs) configured to execute instructions stored on the memory 530. Additionally, the computing device 502 may be configured to communicate (e.g., with the database 504 and/or the training database 506) using a network 508. For example, the computing device 502 may communicate with the network 508 using one or more wired network interfaces (e.g., Ethernet interfaces) and/or wireless network interfaces (e.g., Wi-Fi®, Bluetooth®, and/or cellular data interfaces). In certain instances, the network may be implemented as a local network (e.g., a local area network), a virtual private network, L1, and/or a global network (e.g., the Internet).

In certain instances, all or part of the systems 100, 500 may be combined. For example, as explained previously, the training database 506 may be at least partially implemented by the training database 106. Additionally or alternatively, the computing devices 102, 502 may be implemented by the same computing device. In still further implementations, the systems 100, 500 may be implemented in a distributed computing environment (e.g., a cloud computing environment). In such instances, each of the systems 100, 500 may be implemented by one or more (e.g., a plurality of) computing devices within the distributed computing environment (e.g., within one or more clusters of the distributed computing environment).

Figure 6:
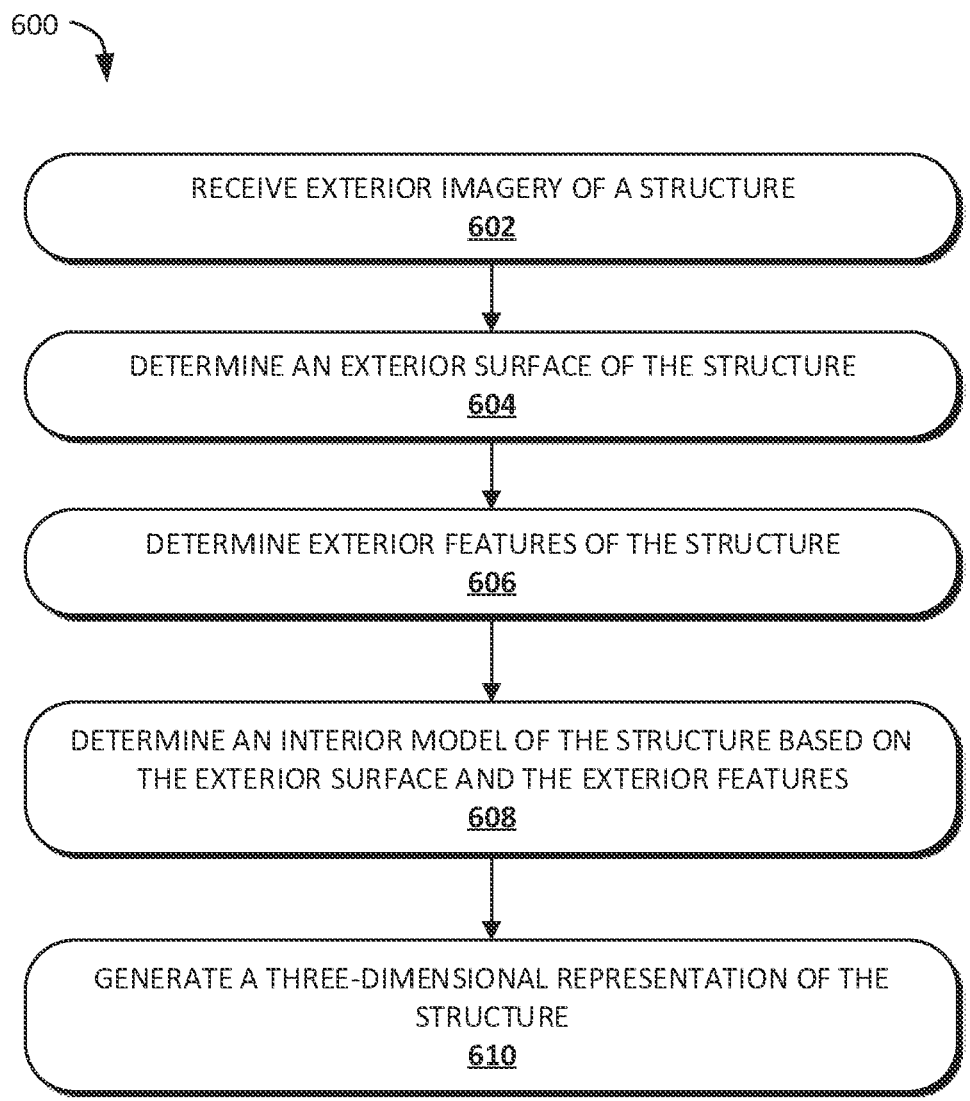
FIG. 6 illustrates a method for predicting interior models of structures according to an exemplary embodiment of the present disclosure.

FIG. 6 illustrates a method 600 for predicting interior models of structures according to an exemplary embodiment of the present disclosure. In particular, the method 600 may be performed to predict interior models 134 for structures 108 based on exterior imagery 112 of the structures. The method 600 may be implemented on a computer system, such as the system 100. For example, the method 600 may be implemented by the computing device 102. The method 600 may also be implemented by a set of instructions stored on a computer readable medium that, when executed by a processor, cause the computer system to perform the method 600. For example, all or part of the method 600 may be implemented by the processor 142 and the memory 144. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 may begin with receiving exterior imagery of a structure (block 602). For example, the computing device 102 may receive exterior imagery 112 of a structure 108. The exterior imagery 112 may depict one or more exterior surfaces of the structure 108. For example, the exterior imagery 112 may depict an exterior surface of the structure 108 as visible from above, below, or outside of the structure 108. In certain implementations, as explained above, the exterior imagery 112 may depict a three-dimensional exterior view of the structure 108.

An exterior surface of the structure may be determined (block 604). For example, the heating device 102 may determine an exterior surface 126 of the structure 108. In certain implementations, the exterior surface 126 may include a three-dimensional representation of the exterior dimensions of the structure 108. For example, the exterior surface 126 may represent exterior contours of the building as visible from within the exterior imagery 112. Accordingly, the exterior surface 126 may include contours or other representations of various exterior features 132 on the structure 108 (e.g., decorative features, functional features, structural features). The exterior surface 126 may be determined using a machine learning model 124. For example, the machine learning model 124 may be configured to extract the exterior surface 126 from one or more exterior images of the structure 108 contained within the exterior imagery 112. In implementations where the exterior imagery 112 includes a three-dimensional representation (e.g., a three-dimensional image) of the structure 108, determining the exterior surface 126 may include extracting the three-dimensional contour of the structure 108 from the contours of other structures in the surrounding area within the exterior imagery 112. In implementations where the exterior imagery 112 does not include a three-dimensional representation of the structure 108, determining the exterior surface 126 may include combining multiple views of the structure 108 into the exterior surface 126.

Exterior features of the structure may be determined (block 606). For example, computing device 102 may determine exterior features 132 of the structure 108. The exterior features 132 may be identified from within the exterior imagery 112. For example, the computing device 102 may use a machine learning model 124 to identify exterior features 132. In one particular instance, the machine learning model 124 may be configured to identify doors, windows, visible structural beams, HVAC system components, and exterior plumbing fixtures as exterior features 132. The exterior features 132 may be based on visual depictions of the exterior of the structure 108 within the exterior imagery 112. Furthermore, the exterior features 132 may be identified within the exterior surface 126 and/or a three-dimensional representation of the structure 108 within the exterior imagery 112 (where included).

An interior model of the structure may be determined based on the exterior surface and the exterior features (block 608). For example, the computing device 102 may determine an interior model 134 of the structure 108 based on the exterior surface 126 and the exterior features 132. For example, as explained above, the interior model 134 may be generated by predicting one or more interior features 140 contained within the structure 108. The interior features 140 may be predicted according to one or more of the exterior features 132, common construction practices for structures similar to the structure 108, regulatory requirements for structures similar to the structure 108, structural design rules of thumb, and the like. The interior features 140 may then be arranged within the interior model 134 based on the exterior surface 126 and/or the exterior features 132. For example, where the exterior features 132 include one or more features that are common to both the interior and exterior of the building (e.g., doors, windows, HVAC ducts), the interior features 140 may be arranged to align with corresponding exterior features 132 (e.g., so that interior doors and windows on exterior walls align with exterior doors and windows). As another example, the interior features 140 may be arranged to fit within dimensions specified by the exterior surface 126 (e.g., to fit within the interior space of the structure 108, as indicated by the exterior dimensions of the structure 108 within the exterior surface 126. The interior model 134 and then be generated as a representation (e.g., a three-dimensional representation, a two-dimensional representation) of the interior features 140.

A three-dimensional representation of the structure may be generated (block 610). For example, the computing device 102 may generate a three-dimensional representation 122 of the structure 108 based on the exterior structure 126 and/or the interior model 134. In particular, as explained above, the interior features 140 and/or exterior features 132 may specify physical dimensions 310, 312 for individual features 140, 132. The computing device 102 may accordingly be configured to extrude the exterior features 132 and the interior features 140 according to these physical dimensions 310, 312. In additional or alternative implementations, the interior model 134 may be generated as a three-dimensional representation of the interior of the structure 108. In such instances, the computing device 102 may generate a three-dimensional representation 122 of the structure 108 by combining the three-dimensional exterior surface 126 of the structure 108 with the three-dimensional interior model 134 of the structure 108.

The method 600 accordingly enables computing devices to predict interior models for buildings and other structures without having to see inside of structures or analyze interior plans for the structures. The interior models generated according to the method 600 may be used for structural or other analysis of the structures. For example, predicted interior layouts represented by the interior models may be used by emergency response teams (e.g., paramedics, firefighters, police officers) to predict an interior layout of the structure in which an emergency is taking place. Such plans may then be used by the emergency response teams in navigating the interior of the structure to locate and resolve the emergency. Interior models may also be useful in combat scenarios. For example, military operatives may utilize the interior models to assist in navigating building interiors, similar to the emergency response teams above. As another example, the interior models may be used in a destructive analysis of the structure (e.g., predicting the minimum amount of munitions necessary to destroy or incapacitate the structure 108, to reduce collateral damage from the structure 108 falling on other, nearby structures). As explained above, previous systems for performing these functions typically relied on interior views or interior plans of the structures, or relied on the manual efforts of specialized technicians, which may be unavailable or too slow for use in emergency or combat settings.

Figure 7:
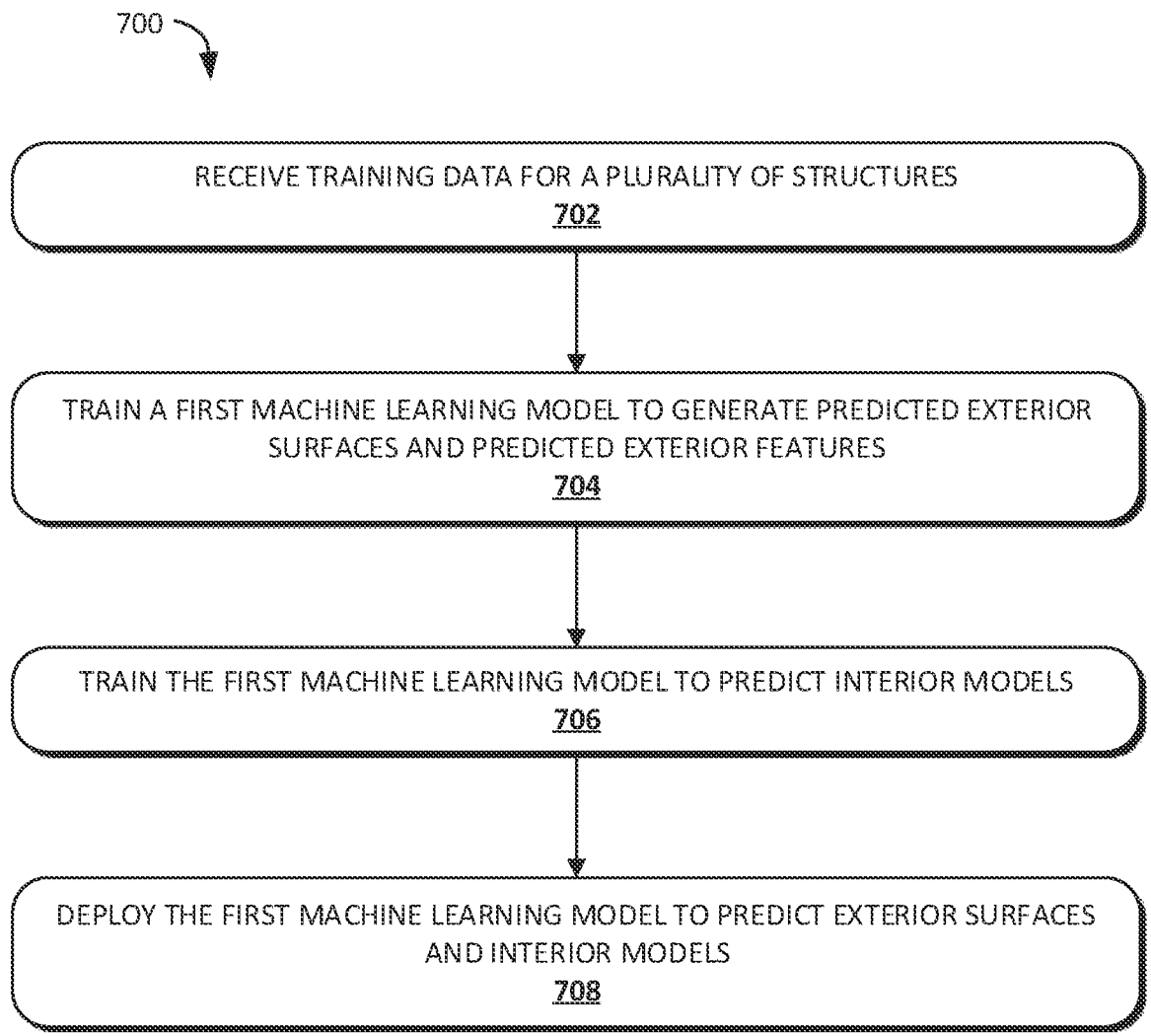
FIG. 7 illustrates a method for training a machine learning model to predict interior models according to an exemplary embodiment of the present disclosure.

FIG. 7 illustrates a method 700 for training a machine learning model to predict interior models according to an exemplary embodiment of the present disclosure. In particular, the method 700 may be used to train a machine learning model, such as the machine learning model 124 to predict interior models 134 for structures 108 based on exterior imagery 112 of the structures 108. The method 700 may be implemented on a computer system, such as the system 500. For example, the method 700 may be implemented by the computing device 502. The method 700 may also be implemented by a set of instructions stored on a computer readable medium that, when executed by a processor, cause the computer system to perform the method 700. For example, all or part of the method 700 may be implemented by the processor 142 and the memory 144. Although the examples below are described with reference to the flowchart illustrated in FIG. 7, many other methods of performing the acts associated with FIG. 7 may be used. For example, the order of some of the blocks may be changed, certain blocks may be combined with other blocks, one or more of the blocks may be repeated, and some of the blocks described may be optional.

The method 700 may begin with receiving training data for a plurality of structures (block 702). For example, computing device 102 (or another computing device) may receive training data for a plurality of structures. The training data may be stored within a training database 106. For example, the training data may include exterior imagery 118, 120 of a plurality of structures. The training data may further include expected interior models 136, 138 and expected exterior surfaces 128, 130 of the structures, along with expected exterior features 146, 148 of the structures. In certain implementations, the expected interior models 136, 138 may be generated by another machine learning model 518. For example, as discussed in greater detail above in connection with the system 500, the expected interior models may be generated by another machine learning model 518 based on architectural plans.

A first machine learning model may be trained to generate predicted exterior surfaces and predicted exterior features (block 704). For example, a first machine learning model 124 may be trained to predict exterior surfaces 126 and exterior features 132 for a structure 108 based on exterior imagery 112 of the structure 108. Training the machine learning model 124 in this way may include providing exterior imagery 118 to the machine learning model 124 and having the machine learning model 124 generate one or more predicted exterior surfaces in exterior features based on the exterior imagery 118, 120. The predicted exterior surfaces generated by the machine learning model 124 may be compared to expected exterior surfaces 128, 130 associated with the exterior imagery 118, 120 within the training data. Similarly, the predicted exterior features may be compared to the expected exterior features 146, 148 associated with the exterior imagery 118, 120 within the training data. One or more differences may be detected between the predicted exterior surfaces and the expected exterior surfaces 128, 130 and/or between the predicted exterior features and the expected exterior features 146, 148. For example, the predicted exterior surface may include three-dimensional geometry that differs from the geometry in a corresponding expected exterior surface. As another example, the predicted exterior features may include a feature not present in corresponding expected exterior features, or may not include a feature that is present in the expected exterior features. As a further example, one or more aspects (e.g., metadata as in FIG. 3) of a predicted exterior feature may differ from aspects of a corresponding expected exterior feature. Based on these differences, one or more parameters of the machine learning model 124 may be adjusted. For example, one or more weights associated with individual features (e.g., individual spatial features within the exterior imagery) may be adjusted. Additionally or alternatively, one or more individual features may be added or removed to the machine learning model 124.

The first machine learning model may also be trained to predict interior models (block 706). For example, the machine learning model 124 may be trained to predict interior models 134 of structures. Training the machine learning model 124 in this manner may include comparing interior models generated by the machine learning model to expected interior models 136, 138. For example, the computing device 102 (or another computing device) may provide exterior imagery 118, 120 to the machine learning model 124. The machine learning model 124 may generate predicted interior models for the corresponding structures based on the exterior imagery 118, 120. For example, the machine learning model 124 may generate a predicted exterior surface and a predicted exterior feature for each set of exterior imagery 118, 120 that is received. Based on the imagery 118, 120, the predicted exterior surfaces, and/or the predicted exterior features, the machine learning model 124 may then generate predicted interior models for the corresponding structures. These predicted interior models may then be compared to the expected interior models 136, 138 corresponding to each exterior imagery 118, 120. One or more differences may then be identified between the predicted interior models and the expected interior models 136, 138. For example, the predicted interior model may include an interior feature not present in a corresponding expected interior model, or may not include an interior feature that is included in the corresponding expected interior model. As another example, one or more aspects (e.g., metadata as in FIG. 3) of a predicted interior feature may differ from aspects of a corresponding expected interior feature. As a further example, one or more interior features may be in a different location within the predicted interior model than in a corresponding expected interior model. Based on these differences, one or more parameters of the machine learning model 124 may be adjusted. For example, one or more weights associated with individual features (e.g., individual spatial features within the exterior imagery) may be adjusted. Additionally or alternatively, one or more individual features may be added or removed to the machine learning model 124. In certain instances, the machine learning model 124 may be trained according to one or more objective functions (e.g., to maximize the objective functions). In certain instances, these objective functions may be formulated to enforce certain constraints (e.g., to ensure that all interior features fit within a corresponding portion of an exterior surface). Other constraints may include ensuring that interior features align with corresponding exterior features, where appropriate, or that an arrangement of certain interior features (e.g., structural assemblies) comply with common construction practices, requirements, and/or rules of thumb.

The first machine learning model may deploy the machine learning model to predict exterior surfaces and interior models (block 708). For example, the machine learning model 124 may be deployed to predict exterior surfaces 126 and interior models 134. For example, the machine learning model 124 may be deployed within the computing device 102 for use in predicting exterior surfaces and interior models in real time based on exterior imagery of structures separate from those used in training the machine learning model 124. For example, a user may capture or otherwise identify (e.g., within the database 104) exterior imagery 112 for a structure 108. The exterior imagery 112 may then be provided to the computing device 102, which may then utilize the machine learning model 124 to predict an exterior surface 126 and interior model 134 for the structure 108. In certain instances, the exterior surface 126 and the interior model 134 may then be used to generate a three-dimensional representation 122 of the structure 108, as discussed above.

The method 700 thus enables computing devices to train machine learning models for use in predicting exterior surfaces and interior models of structures. As explained further above, such representations of structures may be useful in many scenarios (e.g., combat scenarios, emergency response scenarios). Furthermore, in certain implementations, the method 700 relies on unique training data received from a second machine learning model that is capable of generating interior models of buildings based solely on architectural plans for those buildings. Such a system dramatically increases the available training data for the machine learning model 124 trained in the method 700. Accordingly, the machine learning models trained in this way may be significantly more accurate in their interior model predictions than models relying on traditionally available training data.

Furthermore, the method 700 is flexible enough to be used with different types of model architectures. For example, in certain implementations, the machine learning model 124 may be implemented as more than one individual machine learning model. For example, a first machine learning model may be used to predict exterior surfaces 126 and exterior features 132 and a second machine learning model may be used to predict interior models 134. In such instances, the block 704 may be performed to train the first machine learning model, and the block 706 may be performed to train the second machine learning model.

Figure 8:
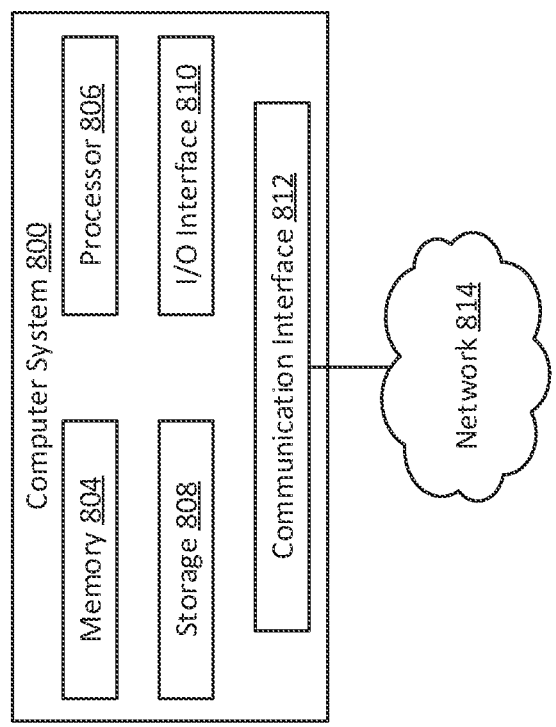
FIG. 8 illustrates a computer system according to an exemplary embodiment of the present disclosure.

FIG. 8 illustrates an example computer system 800 that may be utilized to implement one or more of the devices and/or components discussed herein, such as the computing devices 102, 502, databases 104, 504, and training databases 106, 506. In particular embodiments, one or more computer systems 800 perform one or more steps of one or more methods described or illustrated herein. In particular embodiments, one or more computer systems 800 provide the functionalities described or illustrated herein. In particular embodiments, software running on one or more computer systems 800 performs one or more steps of one or more methods described or illustrated herein or provides the functionalities described or illustrated herein. Particular embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates the computer system 800 taking any suitable physical form. As example and not by way of limitation, the computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 806, memory 804, storage 808, an input/output (I/O) interface 810, and a communication interface 812. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 806 includes hardware for executing instructions, such as those making up a computer program. As an example and not by way of limitation, to execute instructions, the processor 806 may retrieve (or fetch) the instructions from an internal register, an internal cache, memory 804, or storage 808; decode and execute the instructions; and then write one or more results to an internal register, internal cache, memory 804, or storage 808. In particular embodiments, the processor 806 may include one or more internal caches for data, instructions, or addresses. This disclosure contemplates the processor 806 including any suitable number of any suitable internal caches, where appropriate. As an example and not by way of limitation, the processor 806 may include one or more instruction caches, one or more data caches, and one or more translation lookaside buffers (TLBs). Instructions in the instruction caches may be copies of instructions in memory 804 or storage 808, and the instruction caches may speed up retrieval of those instructions by the processor 806. Data in the data caches may be copies of data in memory 804 or storage 808 that are to be operated on by computer instructions; the results of previous instructions executed by the processor 806 that are accessible to subsequent instructions or for writing to memory 804 or storage 808; or any other suitable data. The data caches may speed up read or write operations by the processor 806. The TLBs may speed up virtual-address translation for the processor 806. In particular embodiments, processor 806 may include one or more internal registers for data, instructions, or addresses. This disclosure contemplates the processor 806 including any suitable number of any suitable internal registers, where appropriate. Where appropriate, the processor 806 may include one or more arithmetic logic units (ALUs), be a multi-core processor, or include one or more processors 806. Although this disclosure describes and illustrates a particular processor, this disclosure contemplates any suitable processor.

In particular embodiments, the memory 804 includes main memory for storing instructions for the processor 806 to execute or data for processor 806 to operate on. As an example, and not by way of limitation, computer system 800 may load instructions from storage 808 or another source (such as another computer system 800) to the memory 804. The processor 806 may then load the instructions from the memory 804 to an internal register or internal cache. To execute the instructions, the processor 806 may retrieve the instructions from the internal register or internal cache and decode them. During or after execution of the instructions, the processor 806 may write one or more results (which may be intermediate or final results) to the internal register or internal cache. The processor 806 may then write one or more of those results to the memory 804. In particular embodiments, the processor 806 executes only instructions in one or more internal registers or internal caches or in memory 804 (as opposed to storage 808 or elsewhere) and operates only on data in one or more internal registers or internal caches or in memory 804 (as opposed to storage 808 or elsewhere). One or more memory buses (which may each include an address bus and a data bus) may couple the processor 806 to the memory 804. The bus may include one or more memory buses, as described in further detail below. In particular embodiments, one or more memory management units (MMUs) reside between the processor 806 and memory 804 and facilitate accesses to the memory 804 requested by the processor 806. In particular embodiments, the memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory implementations, this disclosure contemplates any suitable memory implementation.

In particular embodiments, the storage 808 includes mass storage for data or instructions. As an example and not by way of limitation, the storage 808 may include a hard disk drive (HDD), a floppy disk drive, flash memory, an optical disc, a magneto-optical disc, magnetic tape, or a Universal Serial Bus (USB) drive or a combination of two or more of these. The storage 808 may include removable or non-removable (or fixed) media, where appropriate. The storage 808 may be internal or exterior to computer system 800, where appropriate. In particular embodiments, the storage 808 is non-volatile, solid-state memory. In particular embodiments, the storage 808 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 808 taking any suitable physical form. The storage 808 may include one or more storage control units facilitating communication between processor 806 and storage 808, where appropriate. Where appropriate, the storage 808 may include one or more storages 808. Although this disclosure describes and illustrates particular storage, this disclosure contemplates any suitable storage.

In particular embodiments, the I/O Interface 810 includes hardware, software, or both, providing one or more interfaces for communication between computer system 800 and one or more I/O devices. The computer system 800 may include one or more of these I/O devices, where appropriate. One or more of these I/O devices may enable communication between a person (i.e., a user) and computer system 800. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 810 may include one or more device or software drivers enabling processor 806 to drive one or more of these I/O devices. The I/O interface 810 may include one or more I/O interfaces 810, where appropriate. Although this disclosure describes and illustrates a particular I/O interface, this disclosure contemplates any suitable I/O interface or combination of I/O interfaces.

In particular embodiments, communication interface 812 includes hardware, software, or both providing one or more interfaces for communication (such as, for example, packet-based communication) between computer system 800 and one or more other computer systems 800 or one or more networks 814. As an example and not by way of limitation, communication interface 812 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 814 and any suitable communication interface 812 for the network 814. As an example and not by way of limitation, the network 814 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 812 for any of these networks, where appropriate. Communication interface 812 may include one or more communication interfaces 812, where appropriate. Although this disclosure describes and illustrates a particular communication interface implementations, this disclosure contemplates any suitable communication interface implementation.

The computer system 802 may also include a bus. The bus may include hardware, software, or both and may communicatively couple the components of the computer system 800 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-PIN-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these buses. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
    training a machine learning model to predict interior models by:
        receiving a first exterior surface of a first structure;
        predicting, with the machine learning model, a first interior model of the first structure based on a first exterior surface of the first structure;
        detecting one or more differences between the first interior model of the first structure and an expected interior model of the first structure; and
        adjusting one or more parameters of the machine learning model based on the one or more differences;
    receiving exterior imagery of a second structure;
    determining, with the machine learning model, a second exterior surface of the second structure that encloses exterior portions of the second structure depicted within the exterior imagery;
    determining, with the machine learning model, exterior features of the second structure based on the exterior imagery and/or the exterior surface;
    determining, with the machine learning model, an interior model of the second structure based on the exterior surface and the exterior features; and
    generating a three-dimensional representation of interior portions of the second structure and exterior portions of the second structure based on the exterior surface and the interior model.

2. The method of claim 1, wherein the exterior features include at least one of doors, windows, structural support elements, corners, roofs, and/or utility systems of the second structure.

3. The method of claim 1, wherein the second structure has multiple floors and determining the interior model comprises determining multiple interior models for the multiple floors.

4. The method of claim 3, wherein the multiple floors of the second structure are identified based on exterior features of the second structure.

5. The method of claim 4, wherein the multiple floors are identified based on multiple levels of windows at multiple heights within the second structure.

6. The method of claim 1, wherein the method further comprises, prior to receiving the exterior imagery:
    receiving training data for a plurality of structures comprising the first structure, wherein the training data includes exterior imagery of the plurality of structures, expected exterior surfaces for the plurality of structures, expected exterior features for the plurality of structures, and expected interior models for the plurality of structures; and
    training a first machine learning model to generate predicted exterior surfaces and predicted exterior features of at least a subset of the plurality of structures based at least on (i) exterior imagery of the subset of the plurality of structures and (ii) expected exterior surfaces of the subset of the plurality of structures.

7. The method of claim 6, wherein the method further comprises, prior to receiving the training data:
    receiving a plurality of architectural plans for the plurality of structures; and
    generating, with a second machine learning model, the expected interior models for the plurality of structures based on the plurality of architectural plans.

8. The method of claim 6, wherein training the first machine learning model to predict exterior contours and exterior features comprises:
    receiving first exterior imagery of the first structure from the plurality of structures;
    predicting, with the first machine learning model, the first exterior surface of the first structure and first exterior features based on the first exterior imagery;
    detecting one or more differences (i) between the first exterior surface of the first structure and an expected exterior surface of the first structure and/or (ii) between the first exterior features and expected exterior features of the first structure; and
    adjusting one or more parameters of the first machine learning model based on the one or more differences.

9. The method of claim 1, wherein the second structure includes at least one of: a building, a vehicle, an infrastructure component, a ship, a spacecraft, an aircraft, a tank, and/or an appliance.

10. A method comprising:
    receiving training data for a plurality of structures, wherein the training data includes exterior imagery of the plurality of structures, expected exterior surfaces for the plurality of structures, expected exterior features for the plurality of structures, and expected interior models for the plurality of structures;
    training a first machine learning model to generate predicted exterior surfaces and predicted exterior features for at least a subset of the plurality of structures based at least on (i) exterior imagery of the subset of the plurality of structures and (ii) expected exterior surfaces of the subset of the plurality of structures;
    training the first machine learning model to predict interior models for at least the subset of the plurality of structures based at least on the predicted exterior surfaces and the predicted exterior features by:
        receiving a first exterior surface and first exterior features of a first structure from the plurality of structures;
        predicting, with the first machine learning model, a first interior model of the first structure based on the first exterior surface of the first structure;
        detecting one or more differences between the first interior model of the first structure and an expected interior model of the first structure; and
        adjusting one or more parameters of the first machine learning model based on the one or more differences; and
    deploying the first machine learning model to predict exterior contours and interior models for additional structures separate from the plurality of structures.

11. The method of claim 10, further comprising, prior to receiving the training data:
  receiving a plurality of architectural plans for the plurality of structures; and
  generating, with a second machine learning model, the expected interior models for the plurality of structures based on the plurality of architectural plans.

12. The method of claim 10, wherein training the first machine learning model to predict exterior contours and exterior features comprises:
  receiving first exterior imagery of a first structure from the plurality of structures;
  predicting, with the first machine learning model, a first exterior surface of the first structure and first exterior features based on the first exterior imagery;
  detecting one or more differences (i) between the first exterior surface of the first structure and an expected exterior surface of the first structure and/or (ii) between the first exterior features and expected exterior features of the first structure; and
  adjusting one or more parameters of the first machine learning model based on the one or more differences.

13. The method of claim 10, wherein the exterior surface of the first structure is one of an expected exterior surface of the first structure included within the training data and/or a predicted exterior surface of the first structure generated by the first machine learning model, and wherein the exterior features of the first structure are one of expected exterior features of the first structure included within the training data and/or predicted exterior features of the first structure generated by the first machine learning model.

14. The method of claim 10, wherein training the first machine learning model to predict the interior models comprises training the first machine learning model to generate interior models that comply with at least one of (i) spatial constraints of the exterior surfaces and/or (ii) common construction methods and structural design requirements.

15. The method of claim 14, wherein the at least one of (i) the spatial constraints of the exterior surfaces and/or (ii) the common construction methods and structural design requirements are represented within an objective function for the first machine learning model.

16. The method of claim 10, wherein deploying the first machine learning model further comprises:
  receiving exterior imagery of a second structure;
  determining, with the first machine learning model, a second exterior surface, second exterior features, and a second interior model of the second structure; and
  generating a three-dimensional representation of interior portions of the second structure and exterior portions of the second structure based on the second exterior surface and the second interior model.

17. The method of claim 16, wherein determining the exterior contours, exterior features, and an interior model of the structure further comprises:
  determining, with the first machine learning model, the second exterior surface of the second structure that encloses exterior portions of the second structure depicted within the exterior imagery;
  determining, with the first machine learning model, the second exterior features of the second structure based on the exterior imaging and/or the exterior surface; and
  determining, with the first machine learning model, the second interior model of the second structure based on the exterior contours and the exterior features.

18. The method of claim 16, wherein the second exterior features include at least one of doors, windows, structural support elements, corners, and/or utility systems of the first structure.

* * * * *